S. D. FORMAN.
WHEEL BRAKE.
APPLICATION FILED MAR. 12, 1910.

1,010,883.

Patented Dec. 5, 1911.

Inventor
Samuel D. Forman.

Witnesses
Wm. S. McDowell
D. W. Gould.

By Victor J. Evans
Attorney

COLUMBIA PLANOGRAPH CO., WASHINGTON, D. C.

UNITED STATES PATENT OFFICE.

SAMUEL D. FORMAN, OF TONOPAH, NEVADA.

WHEEL-BRAKE.

1,010,883.  Specification of Letters Patent.  Patented Dec. 5, 1911.

Application filed March 12, 1910. Serial No. 548,930.

*To all whom it may concern:*

Be it known that I, SAMUEL D. FORMAN, a citizen of the United States, residing at Tonopah, in the county of Nye and State of Nevada, have invented new and useful Improvements in Wheel-Brakes, of which the following is a specification.

The invention relates to an improvement in automobiles, and is particularly directed to the utilization of the wheel or mud guard therefor as an emergency brake.

The main object of the present invention is the provision of a wheel or mud guard of substantial material and the mounting of the same for movement concentric to the wheel, the guard being connected to a manually operable lever whereby it may be moved and projected beneath the forward or rear portion of the wheel to act as an emergency brake.

The invention will be described in the following specification, reference being had particularly to the accompanying drawings, in which:—

Figure 1:
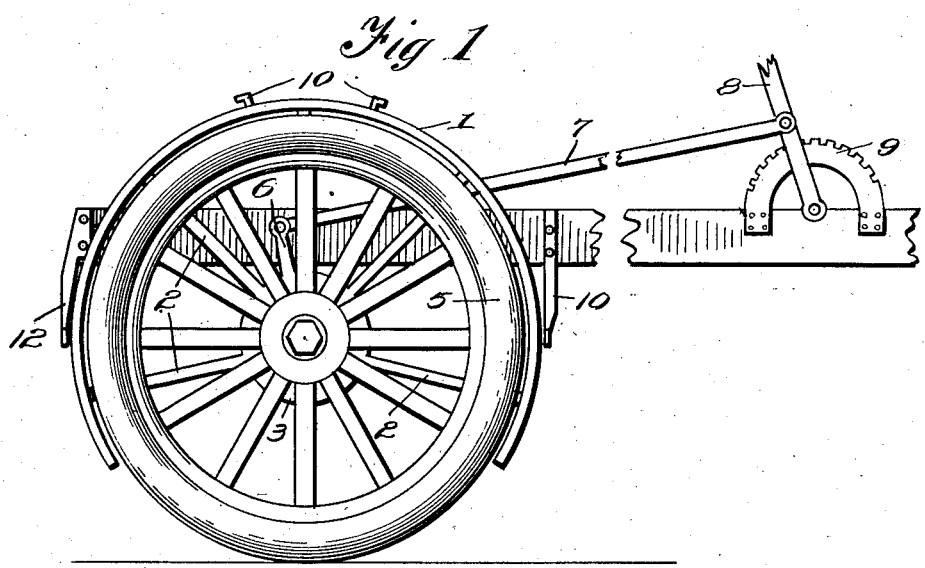
Figure 2:
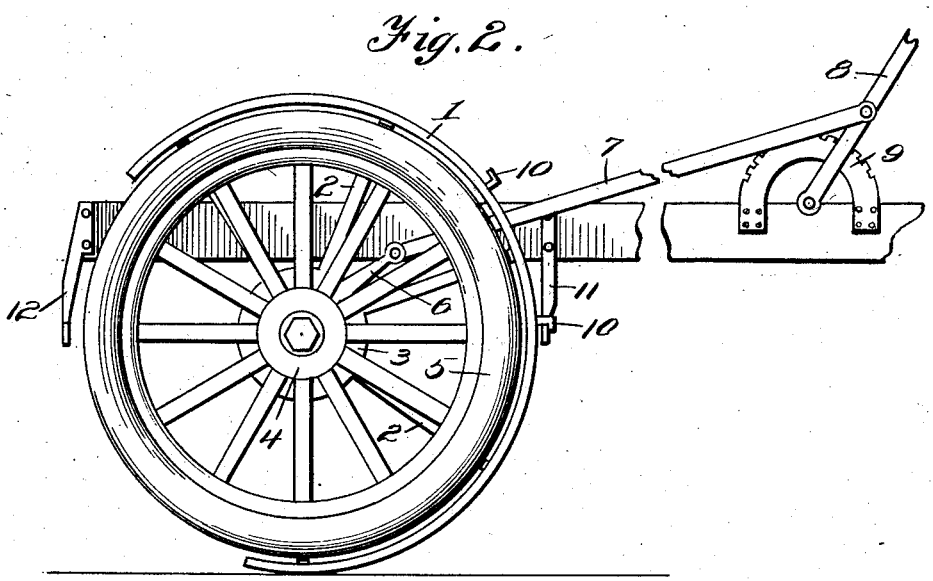

Figure 1 is a broken view in side elevation illustrating the application of the invention, the guard being shown in normal position. Fig. 2 is a similar view with the guard shown in braking position.

Referring particularly to the accompanying drawings, the improved emergency brake contemplates the utilization of the usual wheel or mud guard 1, which includes a strip of substantial material conforming to the peripheral outline of the wheel. The guard is, through the medium of spokes 2, connected to a sleeve 3 rotatably mounted on the hub 4 of the wheel 5, so that the guard is capable of free independent movement in a plane concentric with the plane of the wheel. The sleeve 3 is provided with a radial arm 6 connected through the medium of a rod 7 with a manually operable lever 8 pivotally mounted in a position conveniently accessible to the driver, and provided with the usual dog (not shown) designed to engage a notched segment 9 to secure the lever in adjusted position.

The guard 1 is provided at spaced points with oppositely projecting right angled stops 10 respectively designed to limit movement of the guard in either direction, the forward stop being designed to engage with an arm 11 secured on the automobile framework in advance of the wheel, while the rear stop engages a similar arm 12 arranged in rear of the wheel.

In normal position the strip 1 has the usual function of a mud or wheel guard, as will be evident from Fig. 1 of the drawing. When desired for use as an emergency brake the lever 8 is operated moving the guard about the periphery of the wheel until the stop engages the appropriate limiting arm. When in this position the guard will underlie the wheel preventing contact thereof with the surface and effectively braking the movement of the vehicle.

It is, of course, to be understood that the guard strip is to be of a substantial character for effective service in the connection noted, and that it may be used as an emergency brake in either the forward or rearward movement of the vehicle by a corresponding and appropriate movement of the lever 8.

I claim:

In combination a wheel hub, a sleeve rotatably mounted on the hub, spokes radiating from the sleeve, a wheel guard mounted on the terminals of the spokes, an arm connected with the sleeve, a link connected with the arm, a lever pivotally supported and pivoted to the link, stops secured on the wheel guard at radially spaced points, and arms adapted to engage the stops to limit the movement of the wheel guard on the hub in either direction.

In testimony whereof I affix my signature in presence of two witnesses.

SAMUEL D. FORMAN.

Witnesses:
JOHN COONEY,
J. C. COWDEN.

Copies of this patent may be obtained for five cents each, by addressing the "Commissioner of Patents, Washington, D. C."